United States Patent Office 3,317,524
Patented May 2, 1967

3,317,524
SUBSTITUTED 1,2,3,4-TETRAHYDRO-PYRAZINO[1,2-a]INDOLES
Meier E. Freed, Philadelphia, Pa., assignor to American Home Products Corporation, New York, N.Y., a corporation of Delaware
No Drawing. Filed Feb. 4, 1965, Ser. No. 430,494
34 Claims. (Cl. 260—246)

This invention is directed to novel substituted 1,2,3,4-tetrahydropyrazino[1,2-a]indoles and to intermediates in the preparation thereof.

As determined by standard experimental procedures in warm blooded animals, the claimed final products and intermediates of this invention exhibit activity as anti-inflammatory agents, as central nervous system depressants, as analgesics and as anti-convulsants.

The claimed final products are represented by the following general formula:

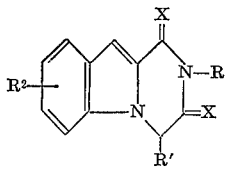

wherein R is di-lower-alkyl-amino-lower-alkyl, hydrogen, morpholino-lower-alkyl, lower alkyl, benzyl, piperidino-lower-alkyl, di-lower-alkoxy-phenethyl, or cyclohexyl; R' is hydrogen or lower-alkyl; R² is hydrogen, lower-alkoxy, fluorine, benzyloxy, or phenoxy; X stands for oxygen or for two hydrogen atoms.

For the purposes of this invention, it should be noted that equivalent substituents for the symbol R include cycloalkyl groups having from three to seven carbon atoms, aralkyl groups such as phenethyl, and halophenethyl, where the halogen substituent may be fluorine, chlorine or bromine; lower-alkylamino and nitrogen-containing heterocyclic members such as, for example, but without limitation, morpholino, pyrrolidino, and piperidino. Equivalent substituents for the symbol R² include bromine, chlorine and fluorine. Compounds having the substituents above-enumerated exhibit the same properties as those compounds which are defined in the appended claims. As used herein, the prefix "lower" appearing before a substituent designates a carbon content ranging from one to five for the substituent.

The claimed compounds can be prepared by two different methods. The Equations (1 and 2) below are representative of these methods and further serve to generically represent the intermediate compounds arising in the synthesis of the final products. The starting materials which are dialkyl-2-carboxyindole-1-alkanoates are known or can be prepared by methods well-known to those skilled in the art.

1.

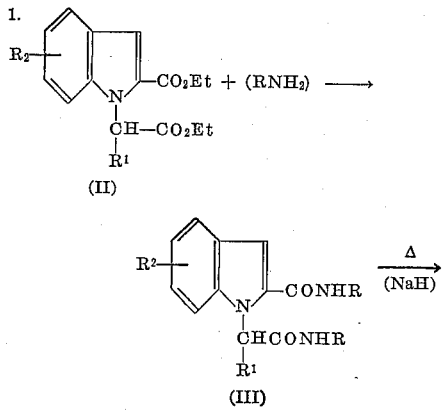

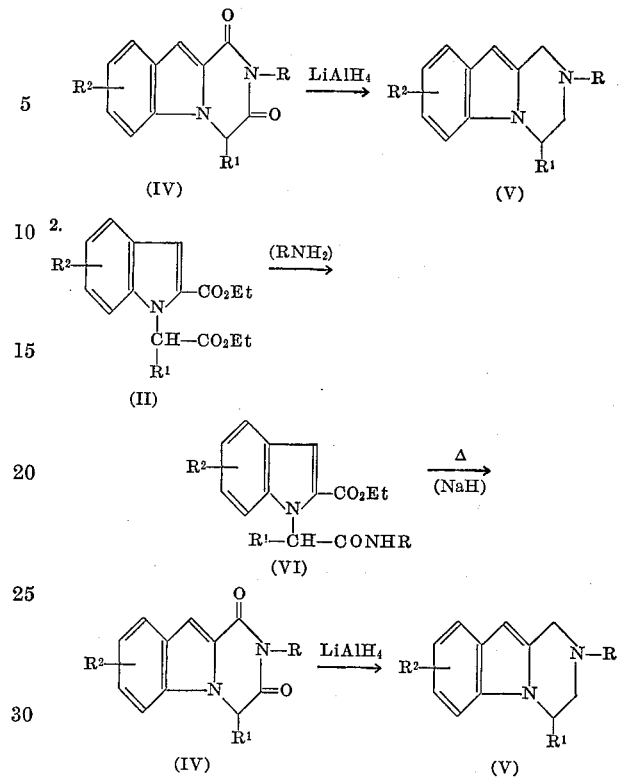

In the above formulae, R, R' and R² have the same meaning previously set forth, and Et is ethyl.

In the reaction illustrated by Equation 1, above, a dialkyl-2-carboxyindole-1-alkanoate (II), such as diethyl-2-carboxyindole-1-acetate, is mixed with a primary amine RNH₂. Where a low-boiling amine has been used, the reactants are allowed to stand at room temperature for 4 to 7 days; with other amines, the resulting mixture is refluxed at its boiling point for around 24 hours. The reaction mixture solidifies on cooling and is diluted with petroleum ether. The products, an N,N'-bis-substituted-2-carbamoylindole-1-acetamide (III) and a substituted amide ester are filtered off, washed with petroleum ether and dried. Intermediate (III) is then heated to 140–180° C. under vacuum at about 200 mm. to cyclize it and the amine formed is distilled off. To insure complete reaction and removal of the amine, the applied heat is increased to 200° C. and kept there for about 2 hours after the apparent formation of distillate ceases. Next, the reaction mixture is cooled to room temperature, dissolved in boiling acetone, treated with decolorizing charcoal and filtered while hot. The filtrate is concentrated to about half its original volume and petroleum ether is added to precipitate the product, which is a 2-substituted-1,3-dioxo-1,2,3,4-tetrahydropyrazino[1,2-a]indole (IV).

In the reaction just described, catalytic amounts of sodium hydride are usually required. This catalyst can be omitted in the case of those reactants where R is hydrogen, or lower alkyl, or contains a tertiary amino group such as in dialkylamino or ethylmorpholino. Compound (IV) then can be reduced to the corresponding 2-substituted-1,2,3,4-tetrahydropyrazino[1,2-a]indole (V) by refluxing it for about 24 hours with lithium aluminum hydride in an inert solvent such as tetrahydrofuran.

In the reaction of Equation 2, substantially equimolar amounts of a diethyl- or other dialkyl-2-carboxyindole-1-acetate or alkanoate (II) and of a primary amine (RNH₂) are dissolved in diphenyl ether or in a similar solvent. The solution then is refluxed at 175–180° C. with distillation of the ethanol as formed thereby forming the corresponding amido-ester which may be isolated (VI). The temperature subsequently is increased to 200° C. and maintained at that point until substantially all the ethanol distils. The same considerations concerning the use of sodium hydride apply here as in the case of Equation 1. Thus if needed sodium hydride would be added before raising the temperature to 200° C. Following this heating stage, the reaction mixture then is cooled to precipitate the product, which is a substituted-1,3-dioxo-1,2,3,4-tetrahydropyrazino[1,2-a]indole (IV). This product can be converted to the corresponding reduced compound (V) as described for Equation 1 above.

The following examples in which all the temperatures are in degrees centigrade illustrate the best mode of practicing the invention.

EXAMPLE 1

*Preparatiion of 1-dimethylaminoethyl-1,3-dioxo-1,2,3,4-tetrahydopyrazino[1,2-a]indole*

(a) A mixture of diethyl-2-carboxyindole-1-acetate (25 g., 0.09 mole) and dimethylaminoethylamine (64.4 g., 0.73 mole) was heated under reflux for 26 hours. After cooling, the mixture solidified and was diluted with 500 ml. of petroleum ether. The product, N,N'-bis-dimethylaminoethyl-2-carbamoylindole-1-acetamide, was filtered from the solution, washed well with petroleum ether, and dried. The yield was 27 g. of diamide, M.P. 139–140.5° C., which is suitable for the next step. For analysis a sample was recrystallizd from acetone-petroleum ether, M.P. 141°–143° C.

(b) The diamide (5 g., 0.014 mole) was placed in a 25 ml. flask fitted with a short distillation column and vacuum take-off head. The pressure was reduced to 200 mm. (house-vacuum) and the pot temperature raised to 140–150°. A distillate formed (dimethylaminoethylamine) and was collected in a calibrated receiver. The pot temperature was slowly raised to 200° and maintained at that point for 2 hrs. The distillate collected amounted to 0.82 g. (67%). The pot residue was cooled to room temperature, dissolved in acetone (50 ml., boiling), treated with Norite A and filtered while hot. The filtrate was concentrated to about 30 ml. and petroleum ether added to turbidity. After cooling the solid was collected by filtration, washed with petroleum ether and dried. After a further recrystallization from heptane and acetone the material melted at 165–170°. Yld.: 1.33 g. (35.3%).

*Analysis.*—Calcd. for $C_{15}H_{17}N_3O_2$: C, 66.40; H, 6.32; N, 15.49. Found: C, 65.92; H, 6.30; N, 15.30.

A solution of 2-dimethylaminoethyl-1,3-dioxo-1,2,3,4-tetrahydropyrazino[1,2-a]indole (1.2 g.) in 20 ml. of ethanol (warm) was treated with alcoholic hydrogen chloride (2 ml. of a saturated solution). Ether was added till turbidity. After standing 12 hours the product crystallized and was filtered from the solution, washed with ether and dried. The hydrochloride (1.0 g.) melted at 268–269° with decomposition.

*Analysis.*—Calcd. for $C_{15}H_{18}ClN_3O_2$: C, 58.53; H, 5.89; Cl, 11.52; N, 13.65. Found: C, 58.70; H, 6.04; Cl, 11.55; N, 13.35.

EXAMPLE 2

*Preparation of 2-dimethylaminopropyl-1,3-dioxo-1,2,3,4-tetrahydropyrazino[1,2-a]indole*

Diethyl-2-carboxyindole-1-acetate (15.1 g., 0.055 mole) and N, N-dimethylaminoproplyamine (5.63 g.,0.055 mole) were dissolved in p-cymene (75 ml.) and placed in a suitable distillation apparatus. The reaction mixture was heated by means of an oil-bath placed around the flask to a temperature of 175–180° at which point ethanol was observed refluxing at the head and was collected in a calibrated receiver until ½ the theoretical amount (3.2 ml.) has been distilled. The bath temperature was increased to 200° and the reactants heated until pure p-cymene distilled (B.P. 174–176°); the total time of heating was 28 hrs. The reaction mass was cooled to room temperature and then placed in the cold overnight. The product was filtered from the solution, washed with petroleum ether, and dried. Yld.: 8.2 g. (52%). M.P. 155–161°. A sample recrystallized from toluene and petroleum ether had a M.P. 159°–162°.

*Analysis.*—Calcd. for $C_{16}H_{19}N_3O_2$: C, 67.35; H, 6.71; N, 14.73. Found: C, 67.55; H, 6.72; N, 14.47.

The hydrochloride was prepared in the usual manner and crystallized from ethanol-ether. M.P. 257–258°. Recrystallization from methanol-ether wave product melting 258.5–260°.

EXAMPLE 3

*Preparation of 2-morpholinoethyl-1,3-dioxo-1,2,3,4-tetrahydropyrazino[1,2-a]indole*

A solution of diethyl-2-carboxyindole-acetate (20 g., .073 mole) and 2-aminoethylmorpholine (6.4 g., 0.05 mole) in 75 ml. of decahydronapthalene was heated to 180–185° under a stream of dry nitrogen. Ethanol was distilled slowly from the reaction. After 24 hrs. the mixture was cooled. The product which crystallized from the solution was filtered off, washed with acetone and dried. After recrystallization from hot acetone it melted 221–222°. The yield was 10 g. (65%).

*Analysis.*—Calcd. for $C_{17}H_{19}N_3O_3$: C, 65.18; H, 6.11; N, 13.41. Found: C, 64.96; H, 6.19; N, 13.74.

A solution of the base (7 g.) in methylenedichloride (350 ml.) was treated with dry hydrogen chloride. The hydrochloride separated from the solution and was filtered off, washed with ether, and dried. Recrystallization from methanol-ether afforded the hydrochloride, M.P. 288–290°. Yld.: 4 g.

*Analysis.*—Calcd. for $C_{17}H_{20}ClN_3O_3$: Cl, 10.13; N, 12.01. Found: Cl, 10.10; N, 12.38.

EXAMPLE 4

*Preparation of 2-(2-piperidinoethyl)-1,3-dioxo-1,2,3,4-tetrahydropyrazino[1,2-a]indole*

A solution of diethyl-2-carboxyindole-1-acetate (20 g., 0.073 mole) and 2-aminoethylpiperidine (9.6 g., 0.075 mole) in 75 ml. of diphenyl ether was heated slowly to 200–205° under a stream of nitrogen and kept at that temperature for 24 hrs. On cooling the reaction mixture solidified and was diluted with petroleum ether. The product was collected on a funnel, washed with petroleum ether, and dried. Yld.: 14 g. (61%). M.P. 197–200°. After recrystallization from acetone-ether the material melted 201–202°.

*Analysis.*—Calcd. for $C_{18}H_{21}N_3O_2$: C, 69.43; H, 6.80; N, 13.50. Found: C, 69.41; H, 6.70; N, 13.68.

The base (4 g.) was dissolved in acetone-isopropanol and dry hydrogen chloride was passed into the solution to a pH of 2.5–3.0. On standing the product crystallized from the solution and was filtered from the solvent, washed with ether, and dried. M.P. 290–291°. Yld.: 3.1 g.

*Analysis.*—Calcd. for $C_{18}H_{22}ClN_3O_2$: C, 62.02; H, 6.38; Cl, 10.19; N, 12.08. Found: C, 62.03; H, 6.21; Cl, 10.15; N, 12.39.

EXAMPLE 5

*Preparation of N-cyclohexyl-2-ethoxycarbonylindole-1-acetamide*

A solution of diethyl-2-carboxyindole-1-acetate (20 g., 0.073 mole) and cyclohexylamine (7.5 g., 0.075 mole) in diphenyl ether (50 ml.) was heated to 200° over a 4 hr. period, under a stream of nitrogen, and heated at that temperature for 20 hrs. The reaction was allowed to cool to about 35° and poured into a beaker. The mass solidified and was extracted with petroleum ether. The insoluble product was filtered from the solution, washed with pentane and dried, M.P. 165–166.6°. Yld.: 18 g. (78%). A sample recrystallized from toluene had a melting point of 171–174°.

*Analysis.*—Calcd. for $C_{19}H_{24}N_2O_3$: C, 69.49; H, 7.37; N, 8.53. Found: C, 69.99; 7.35; N, 8.85.

EXAMPLE 6

*Preparation of 2-cyclohexyl-1,3-dioxo-1,2,3,4-tetrahydropyrazino[1,2-a]indole*

A solution of N-cyclohexyl-2-ethoxycarboxyindole-1-acetamide (18 g., 0.055 mole) and sodium hydride (0.5 g. of 52% dispersion) in diphenyl ether (80 ml.) was heated at 190–200° under a stream of nitrogen for 10 hrs. The reaction mixture was cooled. The mixture was diluted with petroleum ether, filtered, and the precipitate washed with the same solvent and dried. This yielded 17 g. of product (M.P. 240–245°). This material was slurried with 35–50 ml. of cold ethanol and filtered. The solid was washed on the funnel with ethanol (15 ml.) then with petroleum ether, and dried. M.P. 260–262°. Yld.: 11 g. (71%). An analytical sample was prepared by recrystallization from absolute ethanol. M.P. 267–268°.

*Analysis.*—Calcd. for $C_{17}H_{18}N_2O_2$: C, 72.35; H, 6.43; N, 9.93. Found: C, 72.18; H, 6.26; N, 10.01.

EXAMPLE 7

*Preparation of N-methyl-2-N-methylcarbamoylindole 1-acetamide*

Diethyl-2-carboxyindole-1-acetate (10 g., 0.036 mole) was dissolved in methanol (100 ml.) and dry methylamine was passed into the solution, with cooling, until the volume was approximately doubled. The solution was sealed in a pressure bottle and allowed to stand at room temperature (22–24°). The diamide began to separate from the solution after a few hrs. After standing several days the product was collected by filtration, washed with methanol and dried. There was obtained 7.1 g. (70%) of product with a melting point of 244–245°. Recrystallization from methanol raised the melting point to 248–249°.

*Analysis.*—Calcd. for $C_{13}H_{15}N_3O_2$: C, 63.66; H, 6.16; N, 17.13. Found: C, 63.44; H, 6.00; N, 17.20.

EXAMPLE 8

*Preparation of 2-methyl-1,3,-dioxo-1,2,3,4-tetrahydropyrazino[1,2-a]-indole*

N - methyl - 2 - N - methylcarbamoylindole-1-acetamide (2 g., 0.008 mole) was heated under a stream of nitrogen to just above the melting point (250–260) for 1 hr. After cooling the mass was dissolved in hot acetone containing a small amount of methanol. On cooling the material crystallized and was filtered from the solution, washed with acetone, and dried. Recrystallization from toluene-petroleum ether gave the product (0.58 g., 33%), melting at 230–239° (dec.).

*Analysis.*—Calcd. for $C_{12}H_{10}N_2O_2$: C, 67.28; H, 4.71; N, 13.08. Found: C, 67.53; H. 4.85; N, 12.78.

EXAMPLE 9

*Preparation of 2-(dimethylaminoethyl)-1,2,3,4-tetrahydropyrazino[1,2-a]indole*

A suspension of lithium aluminum hydride (3 g., 0.11 mole) in 75 ml. of tetrahydrofuran was prepared in a 500 ml. 3-necked flask fitted with a sealed stirrer, a reflux condenser protected with a calcium chloride tube, and a dropping funnel with side-arm. To this suspension, well stirred, was added a solution of 2-(2-dimethylaminoethyl) - 1,3 - dioxo - 1,2,3,4-tetrahydropyrazino[1,2-a] indole (7.4 g., 0.026 mole) of in 200 ml. tetrahydrofuran. The reaction mixture was stirred and heated under reflux for 24 hrs. After cooling the mixture was decomposed by the addition of 10 ml. of water. The inorganic material was filtered from the solution and washed thoroughly with tetrahydrofuran containing a little isopropanol. The filtrate was concentrated under vacuum. On cooling the residue solidified yielding 5 g. (79.5%) crude product. The base was dissolved in ethanol and treated with an alcoholic solution of hydrogen chloride. The dihydrochloride precipitated and was filtered from the solution, washed with ethanol, ether, and then dried. After recrystallization from methanol the sample had a melting point of 260–262°.

*Analysis.*—Calcd. for $C_{15}H_{23}Cl_2N_3$: C, 56.81; H, 7.63; Cl, 22.37; N, 13.24;. Found: C, 56.53; H, 7.45; Cl, 22.37; N, 12.98.

EXAMPLE 10

*Preparation of 2-(3-dimethylaminopropyl)-1,2,3,4-tetrayhdropyrazino[1,2-a]indole*

Following the procedure of Ex. 9, 2-(3-dimethylaminopropyl) - 1,3 - dioxo - 1,2,3,4 - tetrayhdropyrazino[1,2-a] indole (8.5 g., 0.03 mole) was reduced with lithium aluminum hydride (6 g., 0.21 mole). The product was purified by distillation and afforded 5.5 g. (71.2%) of 2 - (3 - dimethylaminopropyl) 1,2,3,4-tetrahydropyrazino [1,2-a]indole. B.P. 156–160°/.07 mm. The hydrochloride was prepared in the usual manner and recrystallized from methanol-acetone. M.P. 272–274°.

*Analysis.*—Calcd. for $C_{16}H_{25}Cl_2N_3 \cdot \frac{1}{2}H_2O$; C, 56.68; H, 7.72; N, 12.38. Found: C, 56.88; H, 7.71; N, 12.45. K. Fischer—Calcd.: 2.65. Found: 2.95.

EXAMPLE 11

*2-carbamoylindole-1-acetamide*

Ammonia was led into cold methanol (200 ml.) until the volume increased by 30 ml. This solution was charged into a pressure bottle, together with 1-carbethoxymethyl-2-carbethoxy indole (20.0 g., 0.0726 mole) and allowed to stand at room temperature for one week. The solid that was formed was filtered off, washed and dried to give the product, 18.1 g. (79.5% yield) melting at 229–231° C. Recrystallization from ethanol raised the melting point to 250–250.5°.

*Analysis.*—Calcd. for $C_{11}H_{11}N_3O_2$: C, 60.82; H, 5.10; N, 19.35. Found: C, 60.63; H, 5.32; N, 19.17.

EXAMPLE 12

*N-methyl-2-methyl carbamoyl-5-methoxyindole-1-acetamide*

Methylamine was led into methanol (50 ml.) until the volume reached 125 ml. This solution was charged into a pressure bottle together with 1-carbethoxymethyl-2-carbethoxy-5-methoxy (5.0 g., 0.0163 mole) and allowed to stand at room temperature for 6 days. The solid that was formed was filtered off, washed and dried to give the product, 3.41 g. (75.2% yield), melting at 251.5–252° C.

*Analysis.*—Calcd. for $C_{14}H_{17}N_3O_3$: C, 61.08; H, 6.23; N, 15.26. Found: C, 61.26; H, 6.46; N, 15.49.

EXAMPLE 13

*N-(2-morpholinoethyl)-2-[(2-morpholinoethyl)-carbamoyl]indole-1-acetamide*

A solution of 1-carbethoxymethyl-2-carbethoxyindole (8.26 g., 0.03 mole) and N-(β-aminoethyl)morpholine (27.9 g., 0.24 mole) was heated at reflux for 24 hours. The mixture was cooled, allowed to stand for several days and triturated with petroleum ether. The solid that formed was filtered off and recrystallized from acetonitrile to give the product, 11.37 g. (85.5% yield) melting at 159.5–161° C. A sample was recrystallized from acetonitrile, giving a solid melting at 161–162.5° C.

*Analysis.*—Calcd for $C_{23}H_{33}N_5O_4$: C, 62.28; H, 7.50; N, 15.79. Found: C, 62.08; H, 7.60; N, 15.49.

EXAMPLE 14

*2-dimethylaminoethylcarbamoyl-N-dimethylaminoethyl-5-methoxy-indole-1-acetamide*

A solution of 1-carbethoxymethyl - 2 - carbethoxy-5-methoxyindole (15.0 g., 0.049 mole) and N,N-dimethylethylenediamine (32.5 g., 0.37 mole) was refluxed for 26 hours. The reaction mixture was filtered and the solid washed with petroleum ether. It was recrystallized from acetone-petroleum ether to give the product, 12.94 g. (70.7% yield) melting at 154–155° C.

*Analysis.*—Calcd. for $C_{20}H_{31}N_5O_3$: C, 61.67; H, 8.02; N, 17.98. Found: C, 61.82; H, 7.81; N, 17.83.

EXAMPLE 15

*N-cyclohexyl-2-cyclohexylcarbamoylindole-1-acetamide*

A solution of 1-carbethoxymethyl-2-carbethoxyindole (5.5 g., 0.02 mole) and cyclohexylamine (14.9 g., 0.15 mole) was refluxed for 26½ hours. The mixture was cooled, diluted with petroleum ether and stored in the cold overnight. The solid was removed by filtration and recrystallized from toluene to give the product 5.13 g. (67.2% yield), melting at 267–270°. A small sample was recrystallized from toluene to give a solid melting at 268–271.5° C.

*Analysis.*—Calcd. for $C_{23}H_{31}N_3O_2$: C, 72.41; H, 8.17; N, 11.01. Found: C, 72.16; H, 8.14; N, 10.71.

EXAMPLE 16

*N-(3-dimethylaminopropyl)-2-(3-dimethylaminopropylcarbamoyl)indole-1-acetamide*

A solution of 1-carbethoxymethyl-2-carbethoxyindole (8.26 g., 0.03 mole) and N,N-dimethylaminopropylamine (24.6 g., 0.24 mole) was heated at reflux for 25 hours. The reaction mixture was cooled, diluted with petroleum ether (1:1) and stored in the cold overnight. The solid that was formed was recrystallized from acetone-petroleum ether to give the product, 8.81 g. (75.9% yield) melting at 126.5–128° C.

*Analysis.*—Calcd. for $C_{21}H_{33}N_5O_2$: C, 65.08; H, 8.58; N, 18.07. Found: C, 64.95; H, 8.29; N, 18.16.

EXAMPLE 17

*5-benzyloxy-N-methyl-2-methylcarbamoylindole-1-acetamide*

Methylamine was led into methanol (250 ml.) until the volume increased to 350 ml. This solution was charged into a pressure bottle together with 1-carbethoxymethyl-2-carbethoxy-5-benzyloxyindole (31.6 g., 0.0828 mole). The mixture was allowed to stand at room temperature for 47 hours, then filtered. The solid was recrystallized from dioxane to give 23.7 g. (81.3%) of product melting at 260–260.5° C.

*Analysis.*—Calcd. for $C_{20}H_{21}N_3O_3$: C, 68.36; H, 6.02; N, 11.96. Found: C, 68.07; H, 5.79; N, 12.15.

EXAMPLE 18

*2-morpholinoethyl-1,3-dioxo-1,2,3,4-tetrahydro-8-methoxypyrazino[1,2-a]indole*

A solution of diethyl-5-methoxy-2-carboxyindole-1-acetate (10 g., 0.033 mole) and aminoethylmorpholine (4 g., in 80 ml. of diphenyl ether) was heated under nitrogen at 200–210° C. for 24 hrs. After cooling the reaction mixture was diluted with petroleum ether (500 ml.) and filtered. The precipitate was digested with hot acetone (2× 200 ml.) and filtered. The insoluble material was recrystallized from acetonitrile. M.P. 195°–196°. Yld.: 3.5 g. The acetone extract, on cooling, deposited an additional 1 g. of the product. M.P. 195–196°. The total yld.: 4.5 g. (40.0%).

*Analysis.*—Calcd. for $C_{18}H_{21}N_3O_4$: C, 62.96; H, 6.16; N, 12.24. Found: C, 62.69; H, 5.96; N, 12.32.

The hydrochloride, obtained by treating a solution of the base in acetonitrile with dry hydrogen chloride, and recrystallized from acetonitrile. M.P. 260–261°.

*Analysis.*—Calcd. for $C_{18}H_{22}ClN_3O_4$: Cl, 9.33; N, 11.06. Found: Cl, 9.20; N, 11.06.

EXAMPLE 19

*N - (3,4 - dimethoxyphenethyl) - 2 - ethoxycarbonylindole 1-acetamide*

A solution of diethyl-2-carboxyindole-1-acetate (20 g., 0.073 mole) and 3,4-dimethoxyphenethylamine (13.56 g., 0.075 mole) in 50 ml. of diphenyl ether was heated at 200–210° for 24 hrs. After cooling the reaction mixture was extracted with petroleum ether (300 ml.) and the insoluble product was filtered off. Crystallized from benzene, washed with petroleum ether, and dried. Recrystallization from acetone gave product of melting point 138–139°. Yld.: 19 g. (63.4%).

*Analysis.*—Calcd. for $C_{23}H_{26}N_2O_5$: C, 67.30; H, 6.39; N, 6.83. Found: C, 67.49; H, 6.03; N, 7.12.

*2-(2-[3,4-dimethoxyphenyl]ethyl)-1,3-dioxo-1,2,3,4-tetrahydropyrazino[1,2-a]indole*

A solution of diethyl-2-carboxyindole-1-acetate (10 g., 0.036 mole) and 3,4-dimethoxyphenethylamine (6.8 g., 0.038 mole) in 50 ml. of diphenyl ether was heated at 190–195° for 20 hrs. The reaction mixture was cooled and a catalytic amount of sodium hydride (0.5 g. of 50% dispersion in mineral oil) was added. The reaction was heated to 200° and maintained at that temperature for 20 hrs. After cooling the mixture was extracted with petroleum ether; the product was separated by filtration, washed with petroleum ether, and dried. Crystallized from benzene. M.P. 188–190°. Yld.: 6.0 g. (45.8%).

*Analysis.*—Calcd. for $C_{21}H_{20}N_2O_4$: C, 69.21; H, 5.55; N, 7.69. Found: C, 69.49; H, 5.74; N, 7.37.

EXAMPLE 20

*2-methyl-1,3-dioxo-1,2,3,4-tetrahydropyrazino[1,2-a]indole*

A solution of N-methyl-2-methylcarbamoylindole-1-acetamide (16.8 g., .0685 mole) in diphenyl ether (150 ml.) was heated at about 250° C. under nitrogen until the evolution of basic vapors ceased (about 15 hours). The mixture was cooled, diluted with petroleum ether and the solid which was formed recrystallized from methanol to give the product, 12.7 g. (86.9% yield), melting at 238–245° C.

*Analysis.*—Calcd. for $C_{12}H_{10}N_2O_2$: C, 67.28; H, 4.71; N, 13.08. Found: C, 67.58; H, 4.95; N, 12.89.

EXAMPLE 21

*2-benzyl-1,3-dioxo-1,2,3,4-tetrahydropyrazino-[1,2-a]indole*

A solution of 1-carboxymethyl-2-carbethoxy indole (20.0 g., 0.0726 mole), benzylamine (8.15 g., 0.076 mole) and diphenyl ether 25 ml. was heated at 200° C. for 22 hours, then cooled. The sodium hydride (0.2 g. of a 53.3% dispersion in mineral oil) was added and the mixture further heated at 200° C. for 21½ hours. After cooling, it was poured into petroleum ether (600 ml.) and filtered. The solid was collected and recrystallized from acetone to give the product, 11.2 g. (52.6% yield) melting at 211.5–212.5° C.

*Analysis.*—Calcd. for $C_{18}H_{14}N_2O_2$: C, 74.47; H, 4.86; N, 9.65. Found: C, 74.48; H, 4.70; N, 9.66.

EXAMPLE 22

*2-methyl-1,3-dioxo-1,2,3,4-tetrahydro-8-benzyloxypyrazino[1,2-a]indole*

A solution of 5-benzyloxy-N-methyl carbamoyl-indole-1-acetamide (21.9 g. 0.0623 mole) in diphenyl ether (250 ml.) was heated at 250° C. for 26 hours. The mixture was poured into petroleum ether (10 c.) and filtered. The solid was collected and recrystallized twice from aectonitrile to give the product, 4.5 g. (22.7% yield), melting at 242–244° C.

*Analysis.*—Calcd. for $C_{19}H_{16}N_2O_3$: C, 71.24; H, 5.03; N, 8.75. Found: C, 71.07; H, 4.99; N, 8.97.

EXAMPLE 23

*2-methyl-1,2,3,4-tetrahydropyrazino-[1,2-a]indole*

A suspension of 2-methyl-1,3-dioxo-1,2,3,4-tetrapyrazino[1,2-a] indole (10.5 g., 0.049 mole) in tetrahydrofuran was added during 20 minutes to a suspension of lithium aluminum hydride (15.2 g., 0.4 mole) in 400 ml. tetrahydrofuran. The mixture was heated at reflux for 22 hours, then cooled. Water (40 ml.) was added cautiously. The mixture was stirred for 1 hour, then filtered, washing the filter cake well with tetrahydrofuran. The filtrate and washings were combined, freed of solvent and the residue recrystallized from aqueous acetone to give the product 6.77 g. (74.1% yield) melting at 128–132.5° C. Further recrystallization from aqueous acetone gave a solid melting at 130–133° C.

*Analysis.*—Calcd. for $C_{12}H_{14}N_2$: C, 77.38; H, 7.58; N, 15.04. Found: C, 77.11; H, 7.50; N, 14.81.

The hydrochloride was prepared from the alcoholic solution of the base by treatment with alcoholic hydrogen chloride and recrystallization of the solid from ethanol to give the solid melting at 248–250° C.

*Analysis.*—Calcd. for $C_{12}H_{15}ClN_2$: C, 64.70; H, 6.79; Cl, 15.92; N, 12.57. Found: C, 64.54; H, 6.73; Cl, 16.03; N, 12.30.

EXAMPLE 24

*2-(3,4-dimethoxyphenethyl)-1,2,3,4-tetrahydropyrazino [1,2-a]indole*

To a well stirred solution of lithium aluminum hydride (g., 0.157 mole) in 200 ml. of tetrahydrofuran was added a suspension of 2-(3,4-dimethoxyphenethyl)1,3-dioxo-1,2,3,4-tetrahydropyrazino[1,2-a]indole (5 g.,) in 300 ml. of dry tetrahydrofuran. The reaction mixture was stirred and heated under reflux 12 hrs. The reaction mixture was cooled and 20 ml. of water was added cautiously. After stirring an additional hour the mixture was filtered and the filter-cake washed well with tetrahydrofuran. The filtrate was concentrated under reduced pressure. The residue (3.5 g.) was crystallized from acetone-hexane; recrystallization from acetone yielded 3 g. of product melting at 134–135°. This was converted to a fumaric acid salt and crystallized from acetone. M.P. 180–181°.

*Analysis.*—Calcd. for $C_{25}H_{28}N_2O_6$: C, 66.36; H, 6.24; N, 6.19. Found: C, 66.35; H, 5.96; N, 6.33.

EXAMPLE 25

*2-cyclohexyl-1,2,3,4-tetrahydropyrazino[1,2-a]indole*

Following the procedure of example 9, 2-cyclohexyl-1,3-dioxo-1,2,3,4-tetrahydropyrazino[1,2-a]indole (11 g., 0.031 mole) was added as a slurry in tetrahydrofuran to a suspension of lithium aluminum hydride (10 g.) in dry T.H.F. After 18 hr. reflux the reaction mixture was decomposed, and the product isolated by filtration and concentration. The product was recrystallized from absolute ethanol. Yld.: 4 g. (50.7%). M.P. 145–146°.

*Analysis.*—Calcd. for $C_{17}H_{22}N_2$: C, 80.27; H, 8.72; N, 11.01. Found: C, 80.08; H, 8.67; N, 10.84.

The hydrochloride was prepared in ethanol and recrystallized from acetonitrile. M.P. 253–255°.

*Analysis.*—Calcd. for $C_{17}H_{24}Cl_2N_2$: C, 70.30; H, 7.98; Cl, 12.13; N, 9.63. Found: C, 69.93; H, 8.25; Cl, 11.90; N, 9.80.

EXAMPLE 26

*2-(morpholinoethyl)-1,2,3,4-tetrahydropyrazino [1,2-a]indole*

A solution of 2-(2-morpholinoethyl)-1,3-dioxo-1,2,3,4-tetrahydropyrazino[1,2-a]indole (3.13 g., 0.02 mole) in 50 ml. of dry tetrahydrofuran was added dropwise to a stirred suspension of lithium aluminum hydride (3 g., 0.08 mole) in 50 ml. of the same solvent. After the addition was completed the reaction mixture was heated under reflux for 16 hrs., and cooled. The mixture was treated with 12 ml. of water, filtered, and the filter-cake washed with T.H.F. The filtrate was concentrated under vacuum and the residue crystallized from a mixture of ether and petroleum ether. The product melted 106–107° (yld.: 2.2 g.).

*Analysis.*—Calcd. for $C_{17}H_{23}N_3O$: C, 71.54; H, 8.12; N, 14.73. Found: C, 71.73; H, 8.04; N, 14.48.

The hydrochloride salt, prepared in the usual way and crystallized from ethanol had a melting point of 285° C.

*Analysis.*—Calcd. for $C_{17}H_{25}Cl_2N_3O$: C, 57.05; H, 7.04; Cl, 19.82; N, 11.74. Found: C, 56.82; H, 7.09; Cl, 19.70; N, 11.55.

EXAMPLE 27

*2-(morpholinoethyl)-1,2,3,4-tetrahydro-8-methoxy-pyrazino[1,2-a]indole*

2 - morpholinoethyl - 8 - methoxy - 1,3 - dioxo-1,2,3,4-tetrahydropyrazino[1,2-a]indole (5 g., 0.0146 mole) was reduced with lithium aluminum hydride (3.8 g., 0.1 mole). After 6 hrs. of stirring and refluxing the reaction mixture was decomposed by the cautious addition of water (10 ml.). The product was isolated as usual and crystallized from acetone. M.P. 138–139°. Yld.: 2.6 g. (56.5%).

*Analysis.*—Calcd. for $C_{18}H_{25}N_3O_2$: C, 68.54; H, 7.99; N, 13.32. Found: C, 68.27; H, 7.94; N, 13.03.

The fumaric acid salt was prepared by the addition of 1.6 g. of the base in ethanol to a solution of fumaric acid (1.4 g.). The precipitate was filtered from the solution, washed with ethanol, and dried. M.P. 207–209°.

*Analysis.*—Calcd. for $C_{26}H_{33}N_3O_{10}$: C, 57.03; H, 6.08; N, 7.67. Found: C, 57.00; H, 6.30; N, 7.97.

EXAMPLE 28

*2 - (2 - piperidinoethyl) - 1,2,3,4, - tetrahydropyrazino [1,2-a]indole.*

Following the procedure of Example 9, 2-(2-piperidinoethyl) - 1,3 - dioxo - 1,2,3,4 - tetrahydropyrazino [1,2-a]indole (6 g., 0.02 mole) was reduced with lithium aluminum hydride (5 g.). The product was worked up in the usual manner. After removing the solvent the matter crystallized. Recrystallization from hexane gave 3.8 g. (6.66%) of product. M.P. 81–83°. This was converted to the hydrochloride in methanol. Recrystallized from isopropanol. M.P. 285–287°.

*Analysis.*—Calcd. for $C_{18}H_{27}N_3Cl_2$: C, 60.74; H, 7.64; N, 11.79; Cl, 19.92. Found: C, 60.52; H, 7.83; N, 11.47; Cl, 19.80.

EXAMPLE 29

*2-benzyl-1,2,3,4-tetrahydropyrazino[1,2-a]indole*

A suspension of 2-benzyl-1,3-dioxo-1,2,3,4-tetrahydro-pyrazino[1,2-a]indole (8.04 g., 0.0277 mole) in tetrahydrofuran (600 ml.) was added to a suspension of lithium aluminum hydride (9.06 g., 0.277 mole) in tetrahydrofuran (250 ml.); the mixture was refluxed for 20 hours, then cooled. Water (30 ml.) was added slowly. The mixture was filtered and the filter cake washed well with tetrahydrofuran. The combined filtrate and washings were concentrated and the residue recrystallized twice from aqueous acetone to give the title product, 5.7 g. (79% yield) melting at 89–90° C.

*Analysis.*—Calcd. for $C_{18}H_{18}N_2$: C, 82.40; H, 6.92; N, 10.68. Found: C, 82.47; H, 6.86; N, 10.78.

The hydrochloride was prepared from the base in ether solution by treatment with anhydrous hydrogen chloride to give a solid which melted at 227–230° after recrystallization from ethanol.

11

*Analysis.*—Calcd. for $C_{18}H_{19}ClN_2$: C, 72.35; H, 6.41; Cl, 11.85; N, 9.38. Found: C, 72.21; H, 6.13; Cl, 11.8; N, 9.32.

EXAMPLE 30

*1,2,3,4-tetrahydropyrazino[1,2-a]indole*

A solution of the above-prepared 2-benzyl-1,2,3,4-tetrahydropyrazino[1,2-a]indole hydrochloride (3.8 g., 0.0127 mole) in 175 ml. of methanol was debenzylated by shaking with 0.6 g. of palladium-carbon catalyst in an atmosphere of hydrogen at 45 p.s.i. and 50° C. After 4 hrs. the uptake of hydrogen was complete. After removing the catalyst the solution was concentrated to 50 ml., cooled, and the hydrochloride salt precipitated by the addition of ether (100 ml.). The product was filtered off, washed with ether, and dried; M.P. 240–241°, yld. 1.8 g. (68.2%).

*Analysis.*—Calcd. for $C_{11}H_{13}ClN_2$: C, 63.37; H, 6.28; Cl, 17.02; N, 13.42. Found: C, 63.35; H, 6.59; Cl, 16.80; N, 13.60.

EXAMPLE 31

*2 - methyl - 8 - benzyloxy - 1,2,3,4 - tetrahydropyrazino [1,2-a]indole*

2 - methyl - 8 - benzyloxy - 1,3 - dioxo - 1,2,3,4 - tetrahydropyrazino[1,2-a]indole (3.5 g., 0.01 mole) was added slowly as a suspension in 150 ml. of dry tetrahydrofuran to a vigorously stirred suspension of lithium aluminum hydride (3.42 g., 0.09 mole) in 100 ml. of the solvent. The reaction mixture was heated under reflux and stirred for 24 hrs. After cooling, 11 ml. of water was added dropwise and the mixture stirred 2 hrs. and then filtered. The filter cake was washed well with T.H.F. and the combined filtrate taken to dryness under vacuum. After crystallization from aqueous acetone the product melted 126.5–128° C., yld. 3.4 g.

*Analysis.*—Calcd. for $C_{19}H_{20}N_2O$: C, 78.05; H, 6.9; N, 9.58. Found: C, 77.78; H, 7.10; N, 9.27.

The hydrochloride salt was obtained as a hemi-hydrate melting at 218–220° C.

*Analysis.*—Calcd. for $C_{19}H_{21}ClN_2O \cdot \tfrac{1}{2}H_2O$: C, 67.58; H, 6.57; Cl, 10.44; N, 8.30. Found: C, 67.80; H, 6.36; Cl, 10.70; N, 8.39.

EXAMPLE 32

*Preparation of 2-dimethylaminoethyl-1,2,3,4-tetrahydro-8-fluoropyrazino[1,2-a]indole*

Diethyl - 2 - carboxy - 5 - fluoro - indole - 1 - acetate is reacted with dimethylaminoethylamine according to the procedure of Example 1, to yield 2-dimethylaminoethyl-1,3 - dioxol-1,2,3,5 - tetrahydro - 8 - fluoro - pyrazino[1,2-a]indole. Reduction of this material according to the method of Example 9 yields 2-dimethylaminoethyl-1,2,3,4-tetrahydro-8-fluoropyrazino[1,2-a]indole.

The compounds of the invention are basic in nature and readily form acid addition salts with pharmaceutically acceptable organic and inorganic acids.

The compounds of the present invention can be prepared and administered in a wide variety or oral and parenteral unit dosage forms, singly, or, in combination with other coacting compounds. They can if desired be associated with a carrier which can be a solid material or a liquid in which the compound is dissolved, dispersed, or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs. Such conventional solid carriers as sucrose, starches, etc., or liquid vehicles such as non-toxic alcohols, glycerine, or the like, may be thus used.

What is claimed is:
1. A compound selected from the group of compounds of the following formula:

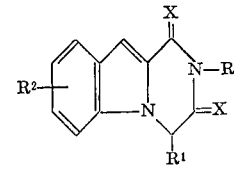

wherein R is selected from the group of di-lower-alkylamino - lower-alkyl, hydrogen, morpholino-lower-alkyl, lower-alkyl, benzyl, piperidino-lower-alkyl, cyclohexyl, and di-lower-alkoxyphenethyl, $R^1$ is selected from the group of hydrogen, and lower-alkyl; $R^2$ is selected from the group of hydrogen, benzyloxy, phenoxy, lower-alkoxy and fluorine; X is selected from the group of oxygen and two hydrogen atoms; and the acid addition salts thereof.

2. A compound of the formula:

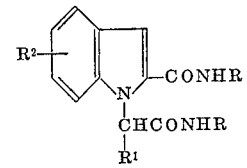

wherein R, $R^1$ and $R^2$ are as stated in claim 1.

3. A compound of the formula:

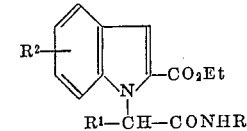

wherein R, $R^1$ and $R^2$ are as stated in claim 1 and Et is ethyl.

4. 2-dimethylaminopropyl-1,3-dioxo-1,2,3,4-tetrahydropyrazino [1,2-a]indole.

5. 2 - morpholinoethyl - 1,3 - dioxo-1,2,3,4-tetrahydropyrazino[1,2-a]indole.

6. 2 - (2 - piperidinoethyl) - 1,3 - dioxo-1,2,3,4-tetrahydropyrazino[1,2-a]indole.

7. N - cyclohexyl - 2 - ethoxycarbonylindole-1-acetamide.

8. 2 - cyclohexyl - 1,3-dioxo-1,2,3,4-tetrahydropyrazino [1,2-a]indole.

9. N - methyl - 2 - N - methylcarbamoylindole-1-acetamide.

10. 2 - methyl - 1,3 - dioxo-1,2,3,4-tetrahydropyrazino [1,2-a]-indole.

11. 2 - (dimethylaminoethyl) - 1,2,3,4-tetrahydropyrazino[1,2-a]indole.

12. 2 - (3 - dimethylaminopropyl)-1,2,3,4-tetrahydropyrazino[1,2-a]indole.

13. 2-carbamoylindole-1-acetamide.

14. N - methyl - 2 - methyl carbamoyl-5-methoxyindole-1-acetamide.

15. N - (2 - morpholinoethyl)-2-[(2-morpholinoethyl)-carbamoyl]indole-1-acetamide.

16. 2 - dimethylaminoethylcarbamoyl - N - dimethylaminoethyl-5-methoxy-1-indole acetamide.

17. N - cyclohexyl - 2 - cyclohexylcarbamoylindole-1-acetamide.

18. N - (3 - dimethylaminopropyl)-2-(3-dimethylaminopropyl-carbamoyl)indole-1-acetamide.

19. 5 - benzyloxy - N - methyl-2-methylcarbamoylindole-1-acetamide.

20. 2 - morpholinoethyl - 1,3 - dioxo-1,2,3,4-tetrahydro-8-methoxypyrazino[1,2-a]indole.

21. N - (3,4 - dimethoxyphenethyl) - 2-ethoxycarbonyl indole.

22. 2 - methyl - 1,3 - dioxo-1,2,3,4-tetrahydropyrazino [1,2-a]indole.

23. 2-benzyl-1,3-dioxo-1,2,3,4-tetrahydropyrazino-[1,2-a]indole.

24. 2-methyl-1,3-dioxo-1,2,3,4-tetrahydro-8-benzyloxy-pyrazino[1,2-a]indole.

25. 2-methyl-1,2,3,4-tetrahydropyrazino-[1,2-a]indole.

26. 2-(3,4-dimethoxyphenethyl)-1,2,3,4-tetrahydropyrazino[1,2-a]indole.

27. 2-cyclohexyl-1,2,3,4-tetrahydropyrazino[1,2-a]indole.

28. 2-(morpholinoethyl)-1,2,3,4-tetrahydropyrazino[1,2-a]indole.

29. 2-(morpholinoethyl)-1,2,3,4-tetrahydro-8-methoxy-pyrazino[1,2-a]indole.

30. 2-(2-piperidinoethyl)-1,2,3,4-tetrahydropyrazino[1,2-a]indole.

31. 1,2,3,4-tetrahydropyrazino[1,2-a]indole.

32. 2-methyl-8-benzyloxy-1,2,3,4-tetrahydropyrazino[1,2-a]indole.

33. 2-dimethylaminoethyl-1,3-dioxo-1,2,3,4-tetrahydropyrazino[1,2-a]indole.

34. 2-dimethylaminoethyl-1,2,3,4-tetrahydro-8-fluoropyrazino[1,2-a]indole.

No references cited.

ALEX MAZEL, *Primary Examiner.*

JOSE TOVAR, *Assistant Examiner.*